US012788645B2

(12) United States Patent
Wegner et al.

(10) Patent No.: US 12,788,645 B2
(45) Date of Patent: Nov. 10, 2026

(54) METHOD OF MODIFYING A MOTORIZED VEHICLE FOR WHEELCHAIR ACCESSIBILITY AND SYSTEM THEREOF

(71) Applicant: The Braun Corporation, Winamac, IN (US)

(72) Inventors: Christopher C. Wegner, Winamac, IN (US); Michael Laird, Indianapolis, IN (US)

(73) Assignee: The Braun Corporation, Winamac, IN (US)

( * ) Notice: Subject to any disclaimer, the term of this patent is extended or adjusted under 35 U.S.C. 154(b) by 357 days.

(21) Appl. No.: 18/602,382

(22) Filed: Mar. 12, 2024

(65) Prior Publication Data

US 2024/0207116 A1 Jun. 27, 2024

Related U.S. Application Data

(63) Continuation of application No. 17/223,056, filed on Apr. 6, 2021, now Pat. No. 11,925,588.

(Continued)

(51) Int. Cl.

| | |
|---|---|
| ***A61G 3/08*** | (2006.01) |
| ***B62D 21/11*** | (2006.01) |
| ***B62D 25/20*** | (2006.01) |

(52) U.S. Cl.

CPC ............ *A61G 3/0808* (2013.01); *B62D 21/11* (2013.01); *B62D 25/2027* (2013.01); *B60G 2800/202* (2013.01); *B60G 2800/203* (2013.01)

(58) Field of Classification Search

CPC .. A61G 3/0808; B62D 21/11; B62D 25/2027; B60G 2800/202; B60G 2800/203

See application file for complete search history.

(56) References Cited

U.S. PATENT DOCUMENTS 4,847,972 A * 7/1989 Anderson .............. A61G 3/066 296/25
6,071,064 A * 6/2000 Hackett .................. A61G 3/066 414/812

(Continued)

FOREIGN PATENT DOCUMENTS

EP 3611080 A1 2/2020
JP 2007245975 A 9/2007

OTHER PUBLICATIONS

International Search Report and Written Opinion of the International Searching Authority for PCT/US2021/025849, Jul. 13, 2021, 12 pages, International Searching Authority for the European Patent Office.

*Primary Examiner* — Jacob B Meyer

(74) *Attorney, Agent, or Firm* — Daniel Tallitsch; Tyler Schultz

(57) ABSTRACT

A hybrid passenger vehicle includes a chassis supported by at least one front wheel and at least one rear wheel, a body coupled to the chassis including at least one door, and a vehicle floor coupled to the chassis. The body defines an interior space configured to be occupied by at least one passenger when operating the vehicle, and the vehicle floor has a front end and a rear end. A rear wall is coupled to the rear end of the vehicle floor such that the rear wall defines a rearmost boundary of the vehicle floor. A rear suspension assembly is coupled to the chassis. The rear wall is arc-shaped, and the rear suspension assembly is located rearward of the rear wall.

15 Claims, 14 Drawing Sheets

Related U.S. Application Data

(60) Provisional application No. 63/006,128, filed on Apr. 7, 2020.

(56) References Cited

U.S. PATENT DOCUMENTS 6,089,817 A * 7/2000 Tauer ..................... A61G 3/067 414/921
6,825,628 B2 * 11/2004 Heigl ................... H02H 7/0851 414/921
7,641,209 B2 * 1/2010 Watters .................. B60G 11/16 296/25
7,837,203 B1 * 11/2010 Schmidt ................. A61G 3/067 280/43.11
8,720,617 B2 * 5/2014 Peng ...................... B62D 47/02 180/68.5
8,926,254 B2 * 1/2015 Pocobello .............. B62D 31/00 414/921
9,056,038 B1 * 6/2015 Schmidt ................. A61G 3/066
9,101,519 B2 * 8/2015 Smith .................. A61G 5/1078
9,126,522 B1 * 9/2015 Perez ...................... B60P 1/433
9,145,179 B1 9/2015 Schmidt et al.
9,789,922 B2 * 10/2017 Dosenbach ............ A61G 3/061
10,010,461 B2 * 7/2018 Kitchin .................. A61G 3/066
10,493,893 B2 * 12/2019 Matsuoka ............... B60P 1/436
10,532,776 B2 * 1/2020 Zindler .................. B62D 65/00
10,562,722 B2 * 2/2020 Pugh .................... B62D 25/025
10,647,357 B2 * 5/2020 Schmidt ................. B62D 65/12
10,667,966 B2 * 6/2020 Bryant ................... A61G 3/062
10,974,582 B2 * 4/2021 Hara ...................... G05D 1/021
10,994,795 B1 * 5/2021 Perez ................... B60K 15/067
11,142,270 B1 * 10/2021 Perez ...................... B60L 50/64
11,320,824 B2 * 5/2022 Niikuni ...................... B60J 5/06
11,465,544 B2 * 10/2022 Hara .................. B62D 25/2054
11,925,588 B2 * 3/2024 Wegner ................ A61G 3/0808
12,077,086 B2 * 9/2024 Boston .................... B60P 1/433
12,202,327 B2 * 1/2025 Murata .................. B62D 25/20
12,257,194 B1 * 3/2025 Almeida ................ A61G 3/067
12,269,538 B2 * 4/2025 Roche .................... B60K 17/22
12,336,939 B2 * 6/2025 Lee ........................ A61G 3/067
12,344,319 B1 * 7/2025 Murray .................. B62D 25/20
12,440,399 B2 * 10/2025 Girardin .............. A61G 3/0808
12,496,954 B2 * 12/2025 Cho ........................ B60P 1/431
2004/0146385 A1 * 7/2004 Edwards ................. B60P 1/431 414/537
2004/0146386 A1 * 7/2004 Goodrich ................. A61G 3/06 414/546
2006/0245883 A1 * 11/2006 Fontaine ................ A61G 3/067 414/537
2014/0232141 A1 * 8/2014 Mochizuki ............. B62D 25/20 296/193.07
2014/0356118 A1 * 12/2014 Friedlinghaus ........ A61G 3/062 414/523
2016/0090141 A1 * 3/2016 Mizukura ................ B62J 35/00 180/219
2016/0220431 A1 * 8/2016 Asztalos ................ B60G 9/003
2016/0221607 A1 * 8/2016 Schmidt ................. B62D 65/12
2018/0086578 A1 3/2018 Pugh et al.
2018/0127034 A1 5/2018 Zindler
2018/0134323 A1 * 5/2018 Niederhofer ........... B62D 25/20
2021/0094623 A1 * 4/2021 Okamura ................. B60K 1/04
2021/0307978 A1 * 10/2021 Wegner .............. B62D 25/2027
2024/0207116 A1 * 6/2024 Wegner ................ A61G 3/0808
2025/0127667 A1 * 4/2025 Pugh ....................... B60L 50/66
2025/0367045 A1 * 12/2025 Alexander ............. A61G 3/061

* cited by examiner

METHOD OF MODIFYING A MOTORIZED VEHICLE FOR WHEELCHAIR ACCESSIBILITY AND SYSTEM THEREOF

RELATED APPLICATIONS

This application claims the benefit of U.S. patent application Ser. No. 17/223,056, filed Apr. 7, 2021, now U.S. Pat. No. 11,925,588, which claims priority to U.S. Provisional Patent Application Ser. No. 63/006,128, filed Apr. 7, 2020, the disclosures of which are hereby incorporated by reference in their entirety.

FIELD OF THE DISCLOSURE

The present disclosure relates to a motorized vehicle for transporting one or more passengers, and more particularly to a motorized vehicle capable of transporting one or more physically limited passengers.

BACKGROUND

Automobile manufacturers do not currently mass-produce passenger vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example, in one configuration, a van may be retrofitted with a ramp to enable a physically limited individual using a wheelchair to enter the vehicle without the assistance of another individual.

Other known level change devices for retrofitting a vehicle, such as a van, include wheelchair lifts, lift platforms, and lowered floor surfaces. In some instances, a door of an original equipment manufacturer (OEM) van is enlarged or otherwise modified to permit entry of the physically limited individual through what is known as the assisted entrance. Once inside the vehicle, individuals may operate the vehicle as a vehicle operator or occupy locations designated for passengers. This may include, but is not limited to, a front passenger location or rear passenger locations.

Many motorized vehicles modified to include a ramp or lift for transporting physically limited passengers are passenger vans or buses. Minivans, or passenger vans, are often referred to as multi-purpose vehicles (MPVs), people movers, or multi-utility vehicles. At least in the United States, minivans are classified as light trucks or MPVs. In many instances, these vans have rear access doors on each side thereof that, when opened, define a door opening that can provide easy ingress and egress of a wheelchair.

Crossover and sport-utility vehicles have become popular due to their style and driving performance. Sport-utility vehicles are built off a light-truck chassis similar to passenger vans, whereas crossover or crossover utility vehicles are built from a passenger car chassis. Due to their build, crossover vehicles are often more fuel efficient than heavier, sport-utility vehicles and include other advantages over minivans and sport-utility vehicles. The modified vehicles are often diesel or gasoline-powered.

There is a need, however, for a hybrid vehicle to be modified for transporting physically limited passengers, including for the ingress and egress of a wheelchair.

SUMMARY OF THE EMBODIMENTS

In one embodiment of the present disclosure, a hybrid passenger vehicle includes a chassis supported by at least one front wheel and at least one rear wheel; a body coupled to the chassis including at least one door, the body defining an interior space configured to be occupied by at least one passenger when operating the vehicle; a vehicle floor coupled to the chassis, the vehicle floor comprising a front end and a rear end; a rear wall coupled to the rear end of the vehicle floor, the rear wall defining a rearmost boundary of the vehicle floor; and a rear suspension assembly coupled to the chassis; wherein, the rear wall is arc-shaped; wherein, the rear suspension assembly is located rearward of the rear wall.

In one example of this embodiment, an apex of the arc-shaped rear wall is a furthest rearward point of the rear wall. In a second example, at least one rearward sidewall is coupled to the vehicle floor, the rear wall being coupled to the at least one rearward sidewall. In a third example, the rear suspension assembly includes a first cross member and a second cross member, the first cross member being located forward of the second cross member. In a fourth example, the rear suspension assembly further includes a first mounting arm and a second mounting arm, the first and second cross members being coupled to the first and second mounting arms.

In a fifth example, the first mounting arm and second mounting arm each include a pair of mounting holes for coupling to the chassis. In a sixth example, the rear suspension assembly includes a first trailing arm and a second trailing arm coupled to the chassis. In a seventh example, the first and second trailing arms are located at least partially below the vehicle floor. In an eighth example, a high voltage tub is integrally coupled to the chassis. In a ninth example, a battery is disposed in the high voltage tub. In a tenth example, the high voltage tub is located towards a front portion of the chassis and below the vehicle floor.

In another example, a fuel tank is located towards a rear portion of the chassis and aligned with or forward of a rear axle of the vehicle. In a further example, the fuel tank is located along a centerline of the chassis.

In another embodiment of the present disclosure a method is provided for modifying an OEM vehicle to a modified vehicle capable of transporting at least one wheelchaired passenger, the OEM vehicle including a chassis supported by a pair of front wheels and rear wheels, a vehicle floor, and a rear suspension assembly, the method including disassembling the conventional rear suspension assembly from the chassis; removing a conventional rear wall from the vehicle floor of the vehicle; coupling an arc-shaped rear wall to the vehicle floor, where an apex of the arc-shaped rear wall is located as a furthest rearward point of the arc-shaped rear wall; decoupling a front cross-member from a first mounting arm and a second mounting arm of the rear suspension assembly; coupling a second front cross-member to the first mounting arm and the second mounting arm; and assembling the rear suspension assembly with the second front cross-member to the chassis such that the second front cross-member is located rearward of the apex of the arc-shaped rear wall.

In one example of this embodiment, the method includes disconnecting the first and second mounting arms from the chassis. In a second example, the method includes providing a rear cross-member coupled to the first and second mounting arms rearward of the front cross-member, the rear cross-member being located rearward of the second front cross-member. In a third example, the front cross-member is coupled at a first location to the respective first and second mounting arms; the second front cross-member is coupled to the first and second mounting arms at a second location along the respective mounting arm, where the second location is rearward of the first location along each mounting arm.

In another example, the method includes moving the vehicle floor from a first height above a ground surface in the OEM vehicle to a location having a second height above the ground surface, where the second height is less than the first height. In yet another example, the method includes removing an OEM fuel tank from the vehicle; providing a low-profile fuel tank; coupling the low-profile fuel tank to the chassis proximate the rear suspension assembly, the low-profile fuel tank being coupled to the chassis at a location aligned with or forward of a rear axle of the vehicle.

In a further embodiment of the present disclosure, a fuel tank for a hybrid vehicle includes a low-profile body comprising a first wing portion and a second wing portion, the first wing portion being coupled to one side of a main body portion and the second wing portion being coupled to an opposite side of the main body portion; at least one mounting hole defined in the first wing portion and the second wing portion for mounting the fuel tank to a chassis of the hybrid vehicle; wherein, the main body portion comprises a greater height than the first and second wing portions; wherein, the first and second wing portions comprise a first angled edge, and the main body comprises a second angled edge, the first angled edge having a greater angle than the second angled edge.

BRIEF DESCRIPTION OF DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION OF THE EMBODIMENTS

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
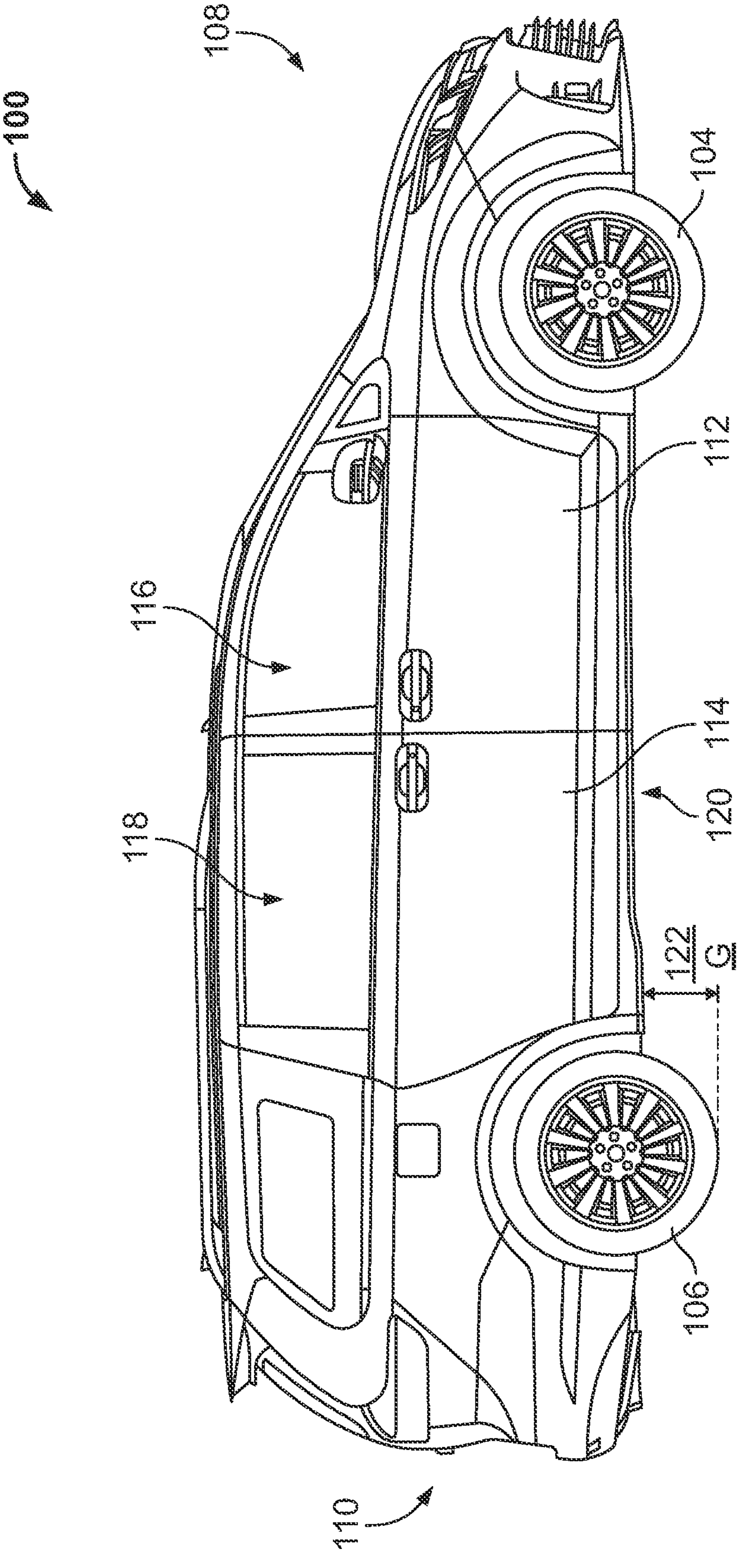
FIG. 1 is a side view of a motorized vehicle.

FIG. 1 illustrates an embodiment of a motorized vehicle 100 available from any number of United States and foreign manufacturers. In the illustrated embodiment, the vehicle 100 may a unibody construction. Other vehicles, however, contemplated within this disclosure may include a frame on body construction. Consequently, the use of the motorized vehicle herein includes all types and kinds of vehicles constructed with a body on frame construction, a unibody construction, or other constructions.

As shown in FIG. 1, the vehicle 100 may include a vehicle body or chassis 102 operatively coupled to front wheels 104 and rear wheels 106 which support the vehicle 100 as it traverses the ground. The front wheels 104 may define a front axle and the rear wheels 106 may define a rear axle of the vehicle 100. The vehicle 100 may include a unibody construction designed off of a truck chassis. The vehicle body 102 may also define a body or vehicle axis through the center of the vehicle 100. The body axis may be defined along the length of the vehicle 100. The vehicle may be designed to have a gross vehicle weight of at least 6000 pounds. In another aspect, the rating may be at least 8000 pounds but less than approximately 10000 pounds. In a further aspect, the rating may be between approximately 6000 and 10000 pounds.

As shown, the vehicle 100 includes a front end 108 and a rear end 110. A conventional driver's seat and front passenger seat (not shown) are generally located towards the front end 108 of the vehicle 100, whereas a rear passenger seat (not shown) is generally located towards the rear end 110 of the vehicle. More specifically, the vehicle 100 may include an interior that comprises a front interior portion 116 and a rear interior portion 118. The driver's seat and front passenger seat may be located in the front interior portion 116, and at least one rear passenger seat may be located in the rear interior portion 118.

The vehicle 100 may include a first or front passenger side door 112 located between the front wheels 104 and rear wheels 106 and provides access to a passenger for sitting in a front passenger seat (not shown) of the vehicle 100 adjacent to the driver. In this position, the passenger has a clearer forward view of the road when compared to sitting in the rear passenger seat of the vehicle 100. Moreover, when seated, the passenger may be facing in a forward direction of travel. Further, in its conventional arrangement, the vehicle 100 of FIG. 1 may include a second or rear passenger side door 114 coupled to the unibody frame.

In at least some crossover vehicles such as the one depicted in FIG. 1, a bench-style seat or three individual seats may be arranged at a location rearward of the driver's seat and front passenger's seat. These rear seat options allow for more passengers to ride in the vehicle.

The vehicle 100 includes a floor 120 as shown in FIG. 1. The floor 120 may be positioned at a conventional or first height 122 relative a ground surface, G.

Figure 2:
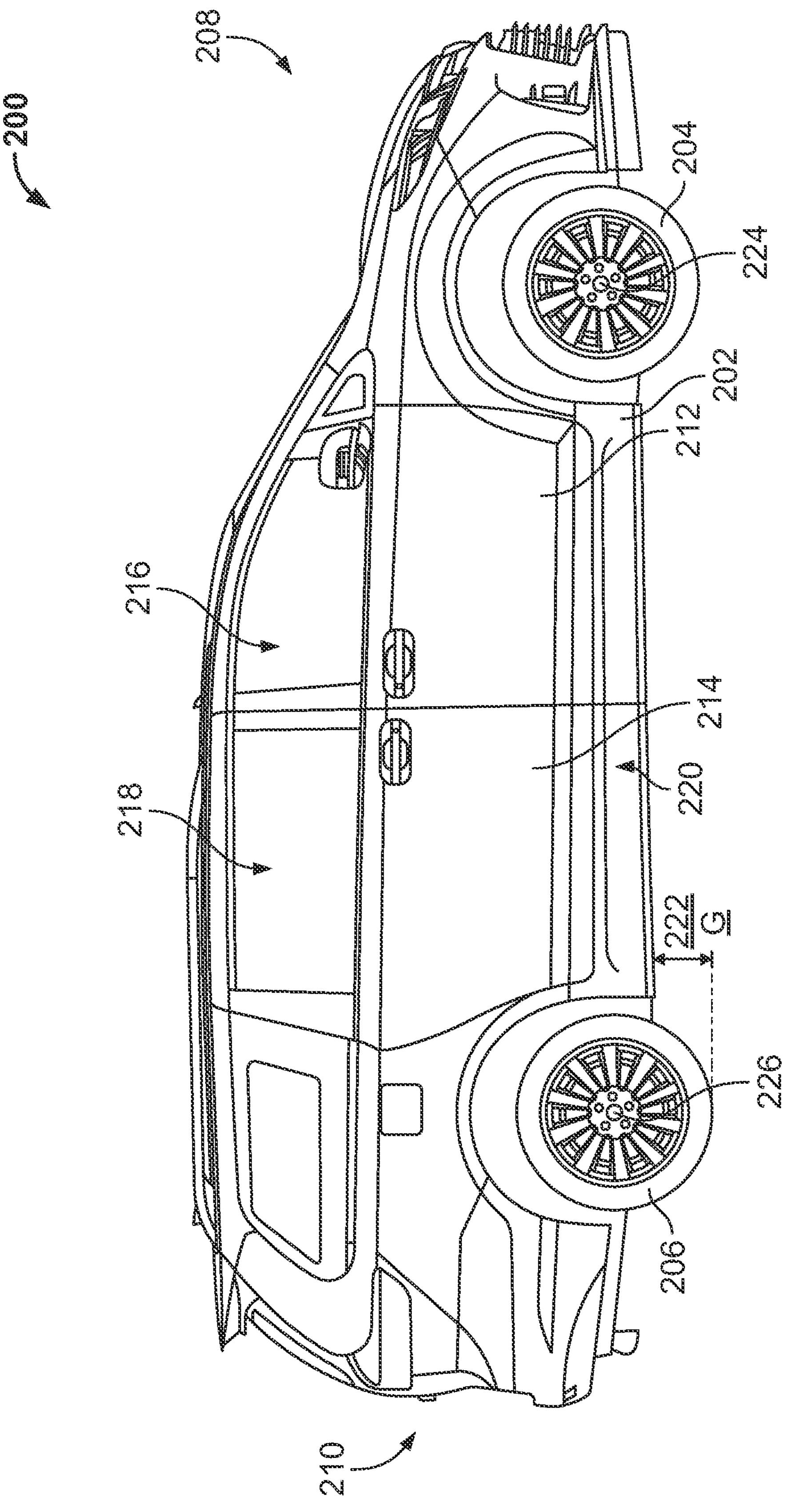
FIG. 2 is a side view of a modified motorized vehicle.

Referring to FIG. 2, a modified vehicle 200 similar to the one illustrated in FIG. 1 is shown. Here, the vehicle may include a body or chassis 202 supported by front wheels 204 and rear wheels 206. The front wheels 204 may define a front axle 224 and the rear wheels 206 may define a rear axle 226 of the vehicle 200. The vehicle 200 includes a front end 208 and a rear end 210, and a front passenger door 212 and a rear passenger door 214. The front passenger door 212 allows access to a front interior portion 216, whereas the rear passenger door 214 allows access to a rear interior portion 218, as is known.

In FIG. 2, the motorized vehicle 200 is modified with a lowered vehicle floor 220 to allow access to the interior thereof by a physically limited passenger or wheelchaired passenger. Here, the floor 220 is positioned above the ground surface, G, by a second height identified by 222. The second height 222 is less than the first or conventional height 122 by at least a few inches in order to make it easier to access the vehicle and also to allow for a larger door opening for a wheelchair to pass through. Federal requirements specify the heights of door openings for wheelchair accessibility, and the second vehicle 200 is modified to meet these requirements.

Figure 3:
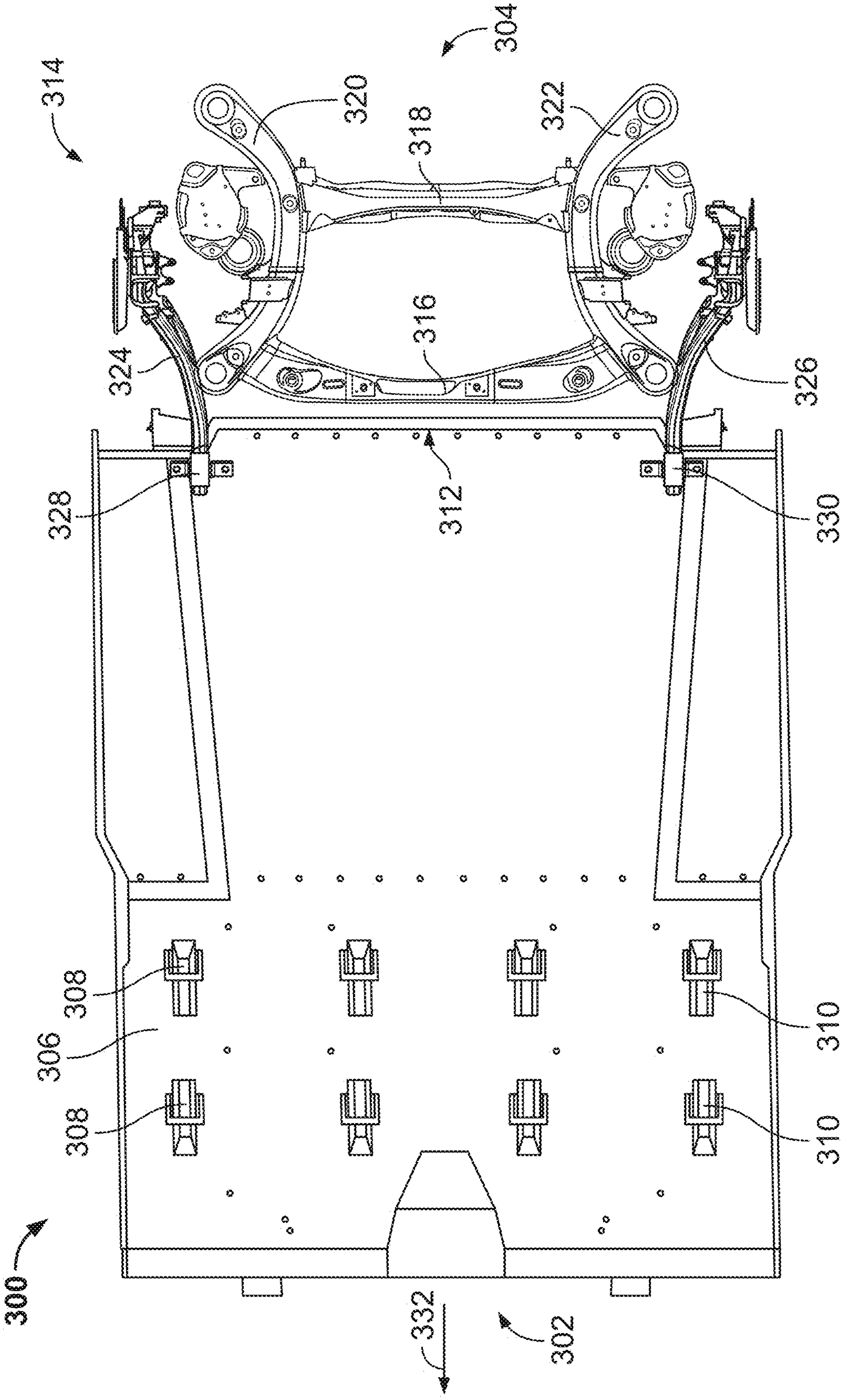
FIG. 3 is a top view of a partial conventional vehicle floor and rear suspension assembly.

In FIG. 3, a view is shown of a conventional vehicle assembly 300 of the motorized vehicle 100. Here, the assembly 300 includes a front end 302 and a rear end 304. The assembly also includes a vehicle floor 306, as shown. A first set of seat anchors 308 are formed in recesses defined in the floor 306 to which a front passenger seat (not shown) may be removably coupled. A second set of anchors 310 formed in corresponding recesses in the floor 306 may allow a driver's seat to be removably coupled thereto.

The conventional vehicle assembly 300 may include a rear wall 312 mounted to the floor 306. As shown, the conventional rear wall is substantially perpendicular to a forward travel direction 332 of the vehicle. Thus, the available floor space defined by the floor 306 is substantially rectangular.

The vehicle assembly 300 may also include a rear suspension assembly 314 as illustrated. Here, the suspension assembly 314 is spaced rearwardly of the rear wall 312. The rear suspension assembly 314 may include a front cross member 316, a rear cross member 318, a first mounting arm 320, and a second mounting arm 322. The front cross member 316 is arc-shaped, whereas the rear cross member 318 is substantially linear. The first and second mounting arms 320, 322 may also be substantially arc-shaped. The mounting arms may each be coupled to the vehicle body or chassis 102, or example.

The rear suspension assembly 314 may also include a first trailing arm 324 and a second trailing arm 326. The first trailing arm 324 may be located on one side of the vehicle assembly 300, i.e., the right side, whereas the second trailing arm 326 may be located on the opposite side thereof, i.e., the left side. The first trailing arm 324 may include a first bushing 328 and the second trailing arm 326 may include a second bushing 330. The first and second bushings may be identical to one another.

When modifying a conventional vehicle 100 having the floor layout such as the one shown in FIG. 3 to allow access for a passenger entering the vehicle via a wheelchair, it is necessary to have as much floor space as possible for the wheelchair user. In particular, it can be important for the user to be able to enter the rear interior portion 118 of the vehicle 100 and turn the wheelchair around to face in a forward direction (i.e., in the forward travel direction 332). Most conventional OEM vehicles 100 lack adequate floor space to allow a wheelchair user to turn the wheelchair around, and this is partly due to the rear wall 312.

Figure 4:
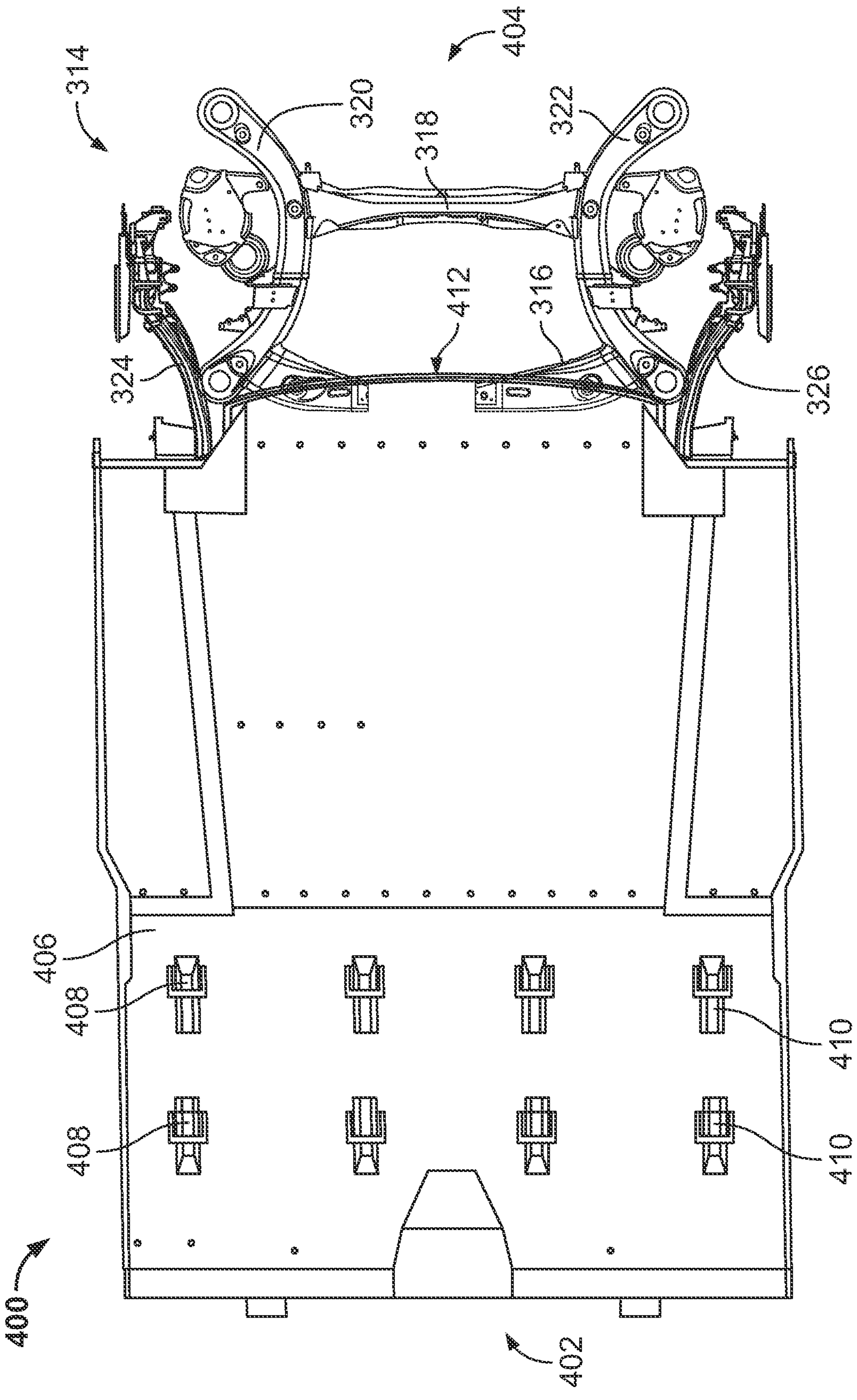
FIG. 4 is a top view of a partial modified vehicle floor and conventional rear suspension assembly.
Figure 8:
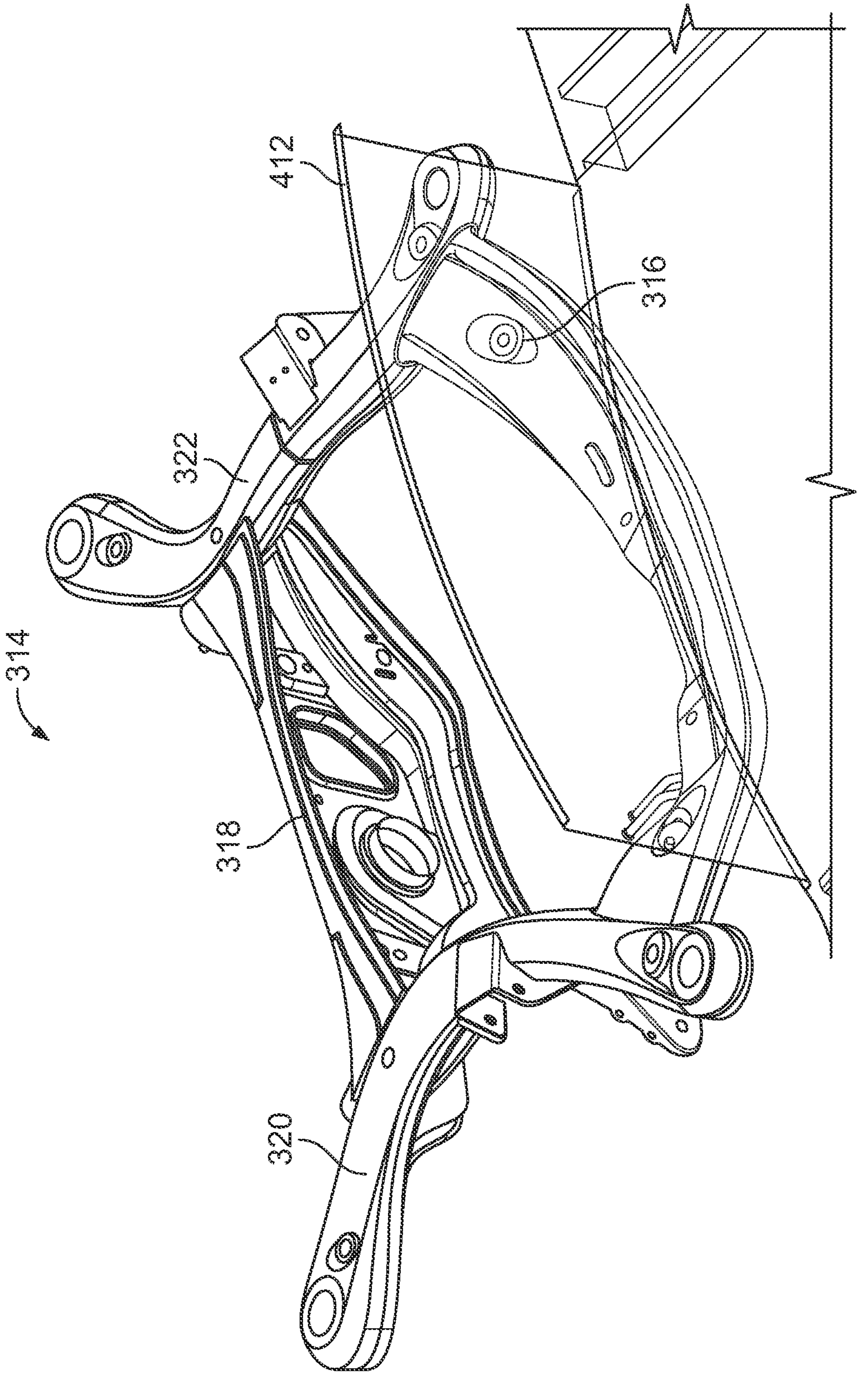
FIG. 8 is a partial perspective view of the modified vehicle floor and conventional rear suspension assembly.
Figure 9:
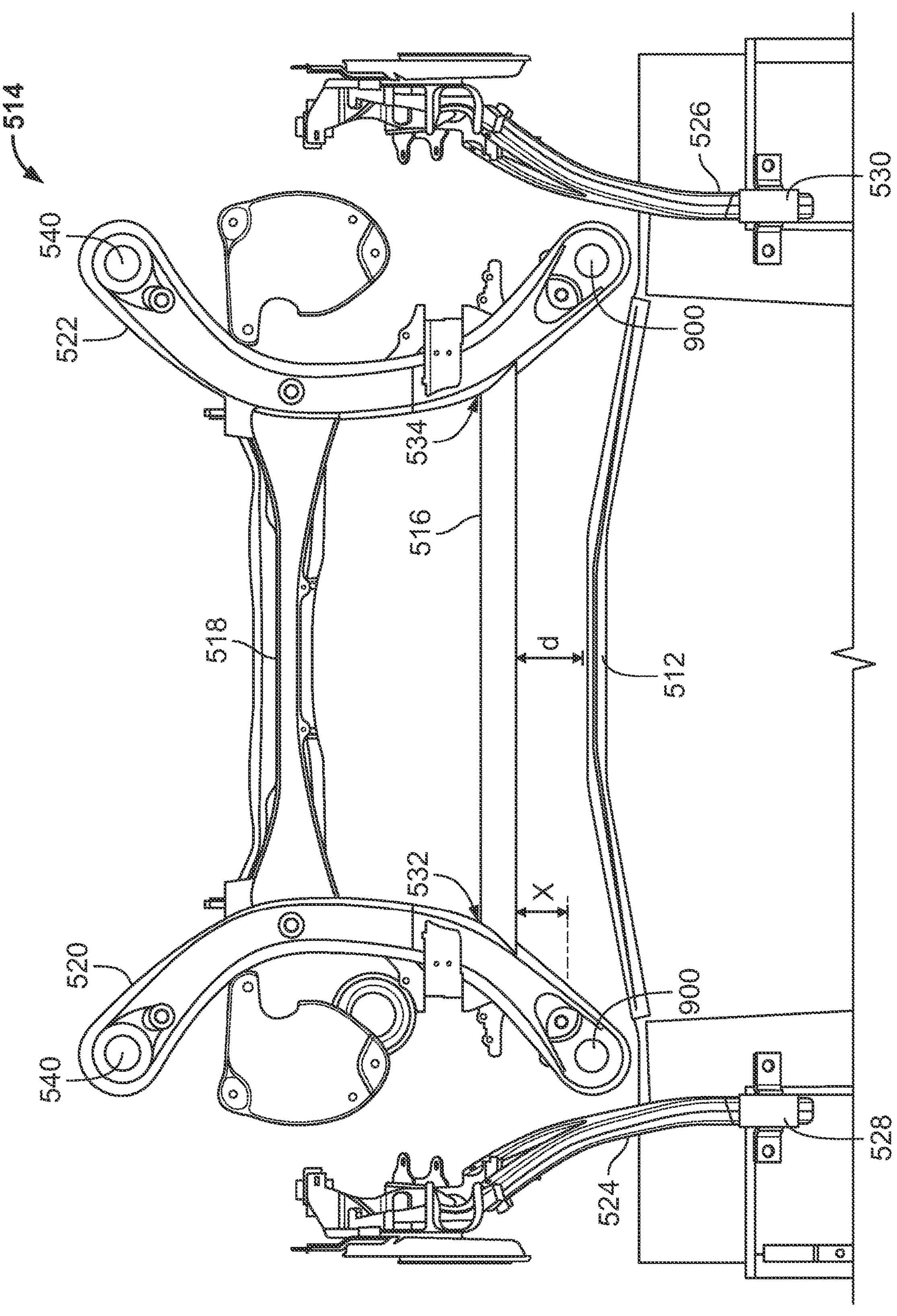
FIG. 9 is a partial top view of the modified vehicle floor and modified rear suspension assembly with trailing arms.

Referring to FIGS. 4 and 8, an alternative vehicle assembly 400 is shown having a front end 402 and a rear end 404. The vehicle chassis may be supported by a plurality of wheels similar to the vehicles of FIGS. 1 and 2. The vehicle assembly 400 may include a vehicle floor 406 modified to provide additional floor space for a wheelchair user to rotate or pivot the wheelchair to a forward facing direction. The floor 406 is designed to include a first set of anchors 408 for removably mounting a front passenger seat to the floor and a second set of anchors 410 for removably mounting a driver's seat to the floor. Advantageously, the vehicle floor 406 may include an arc-shaped rear wall 412 which provides additional room in the rear interior portion for the wheelchair to turn around upon entry therein.

In order to provide the additional floor space in the interior of the vehicle assembly 400, however, the rear wall 412 arcs rearwardly into a space occupied by the front cross-member 316 of the rear suspension assembly 314. As shown in FIGS. 4 and 8, there is an interference between the cross-member 316 and the rear wall 412. In one non-limiting example, the cross-member 316 may protrude several inches (e.g., 3 inches) into the interior cabin of the vehicle assembly. Thus, while the additional floor space is necessary for a wheelchair user to pivot upon entry into the vehicle, the modified rear wall interferes with the rear suspension assembly 314.

To overcome the issues presented in the aforementioned embodiments, another embodiment of a vehicle assembly 500 is illustrated in FIGS. 5-7 and 9-10. Here, the vehicle 500 may include a front end 502 and a rear end 504. The vehicle 500 includes a vehicle floor 506 having a first set of anchors 508 for removably mounting a front passenger seat to the floor and a second set of anchors 510 for removably mounting a driver's seat to the floor.

The vehicle 500 includes an arc-shaped rear wall 512 to better allow a wheelchair user to turn around once inside the vehicle. This additional floor space provided by the modified rear wall is similar to that in FIG. 4.

Figure 5:
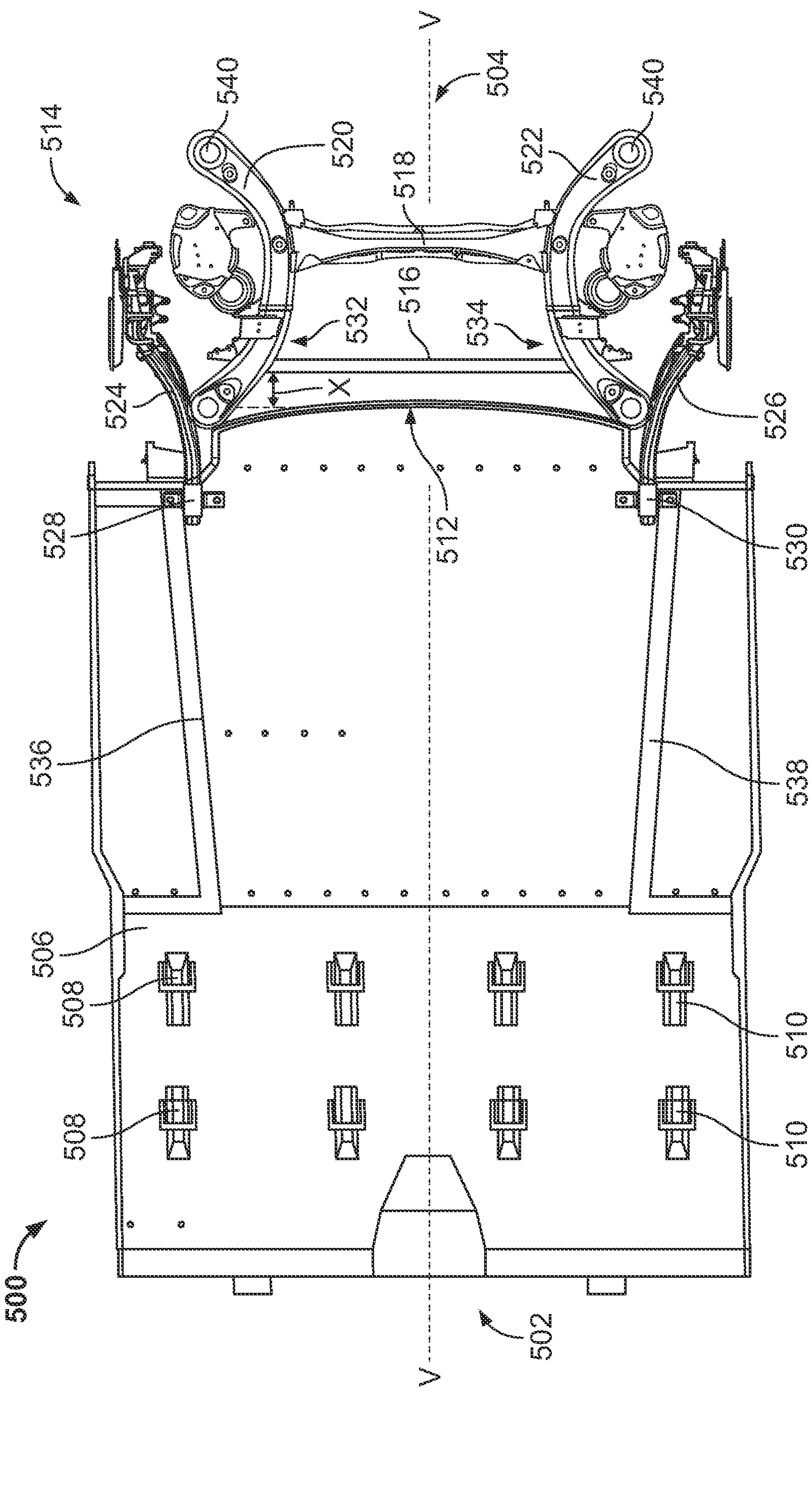
FIG. 5 is a top view of a partial modified vehicle floor and modified rear suspension assembly.

The vehicle 500 may also include a rear suspension assembly 514 as shown. The rear suspension assembly 514 may include a modified front cross-member 516, a rear cross-member 518, a first mounting arm 520, and a second mounting arm 522. The pair of cross members are coupled between the pair of mounting arms as shown in FIG. 5. The mounting arms may each include a forward mounting hole 900 and a rear mounting hole 540. The mounting holes 540, 900 allow the rear suspension assembly 514 to be assembled to the vehicle chassis via fasteners (not shown).

The rear suspension assembly 514 may also include a first trailing arm 524 and a second trailing arm 526. The first trailing arm 524 may be located on one side of the vehicle, whereas the second trailing arm 526 may be located on the opposite side thereof. The first trailing arm 524 may include a first bushing 528 and the second trailing arm 526 may include a second bushing 530. The bushings may be used when coupling the trailing arms to the chassis.

The vehicle floor 506 of FIG. 5 is shown including wire channels 536, 538 formed therewith in order to run wiring and the like in the vehicle 500.

The vehicle 500 of FIG. 5 is shown with the modified arc-shaped rear wall 512 and a modified rear suspension assembly 514 that does not interfere with the rear wall 512.

A method of modifying a conventional or an original equipment manufacturer (OEM) vehicle to the vehicle 500 of FIG. 5 is part of the present disclosure. A conventional setup as shown in FIG. 3 may first be modified by disassembling the rear suspension assembly from the vehicle body, and removing the substantially linear rear wall 312. Next, the arc-shaped rear wall 512 may be coupled to the vehicle via any known technique including welding and/or the use of fasteners.

Once the rear wall 512 is in place, the original front cross-member 316 may be disassembled or cut away from the mounting arms. A new structural front cross-member 516 may be used to replace the original front cross-member 316. In one example, the new front cross-member 516 may be substantially linear. In another example, the modified front cross-member 516 may be formed from a U-channel or tubular steel. Other material may also be used. The front cross-member 516 may be coupled to the first and second mounting arms 520, 522 at locations spaced rearwardly by a distance X (see FIGS. 5 and 9) from where the conventional front cross-member 316 was connected. In one embodiment, the front cross-member 516 may be welded to the first mounting arm 520 at a first weld location 532 and to the second mounting arm 522 at a second weld location 534. Once the front cross-member 516 is welded to the first and second mounting arms, the rear suspension assembly 514 can be connected to the vehicle chassis. Once the rear suspension assembly 514 is in place, it is shown that a gap, d, is available between the front cross-member 516 and an apex (or furthest rearmost point) of the rear-facing surface of the arc-shaped rear wall 512.

Figure 6:
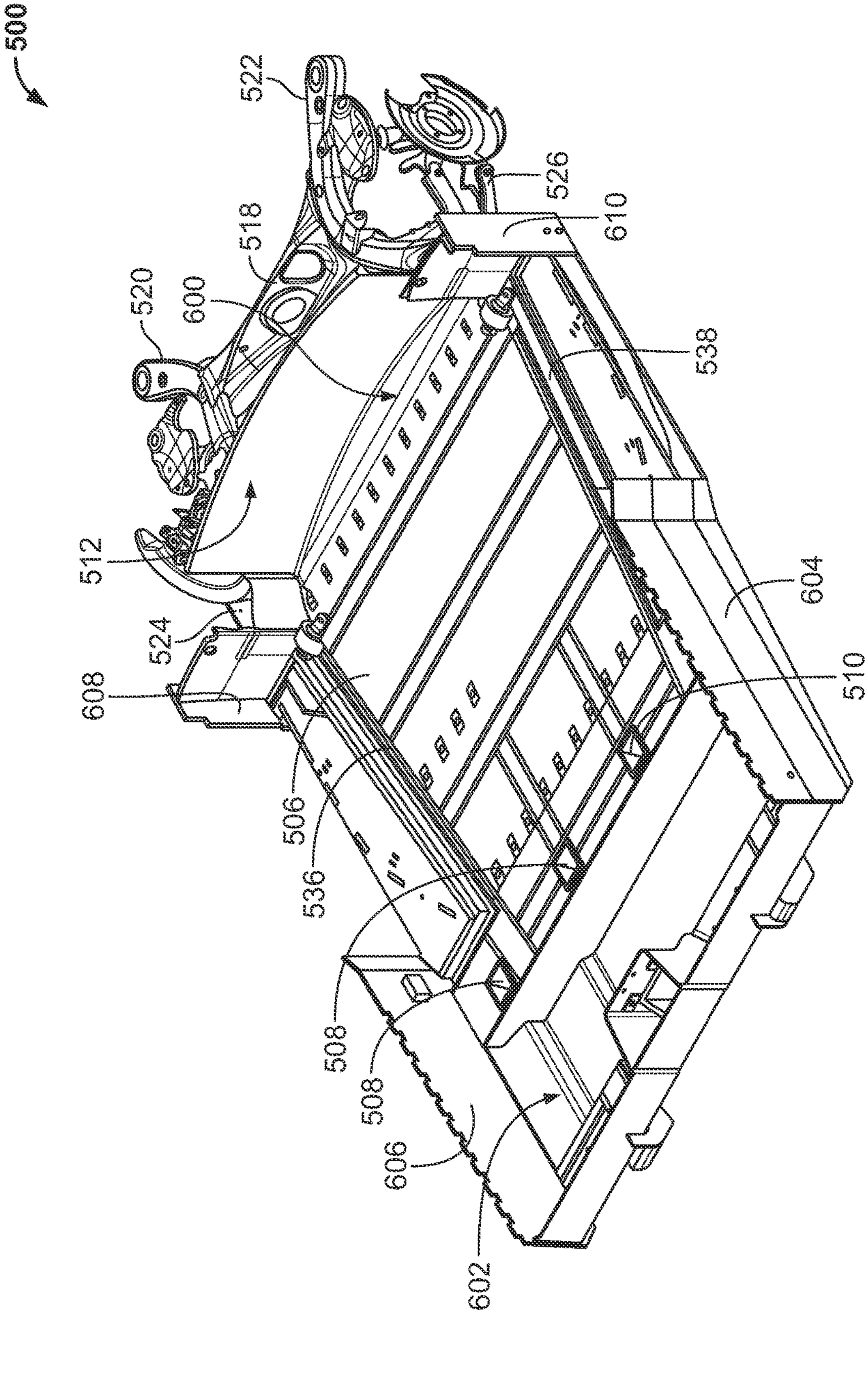
FIG. 6 is a perspective view of the vehicle floor and rear suspension assembly of FIG. 5.
Figure 7:
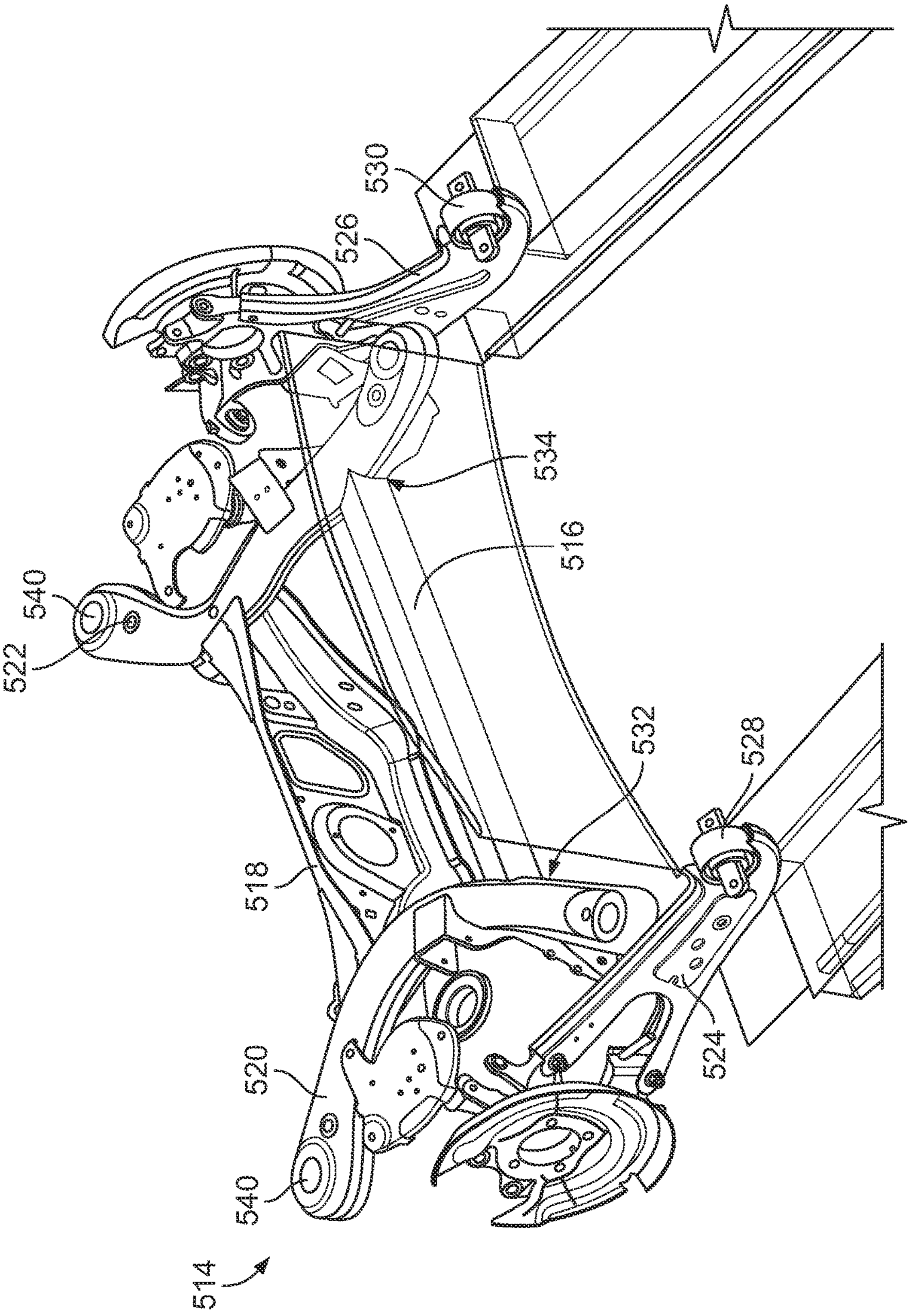
FIG. 7 is a partial perspective view of the rear suspension assembly of FIG. 5 with a pair of trailing arms.

With the arc-shaped rear wall 512, the vehicle floor 506 provides additional floor space 600 as best shown in FIG. 6 for a wheelchair user to turn around. The additional floor space 600 may be at least partially defined by a first rear sidewall 608, a second rear sidewall 610, and the rear wall 512. A first front sidewall 604 and a second front sidewall 606 are located near the front 502 of the vehicle 500. Previously, the wheelchair may contact the conventional rear wall 312, but the additional floor space 600 allows ample room to pivot the wheelchair to face in a forward direction.

Figure 10:
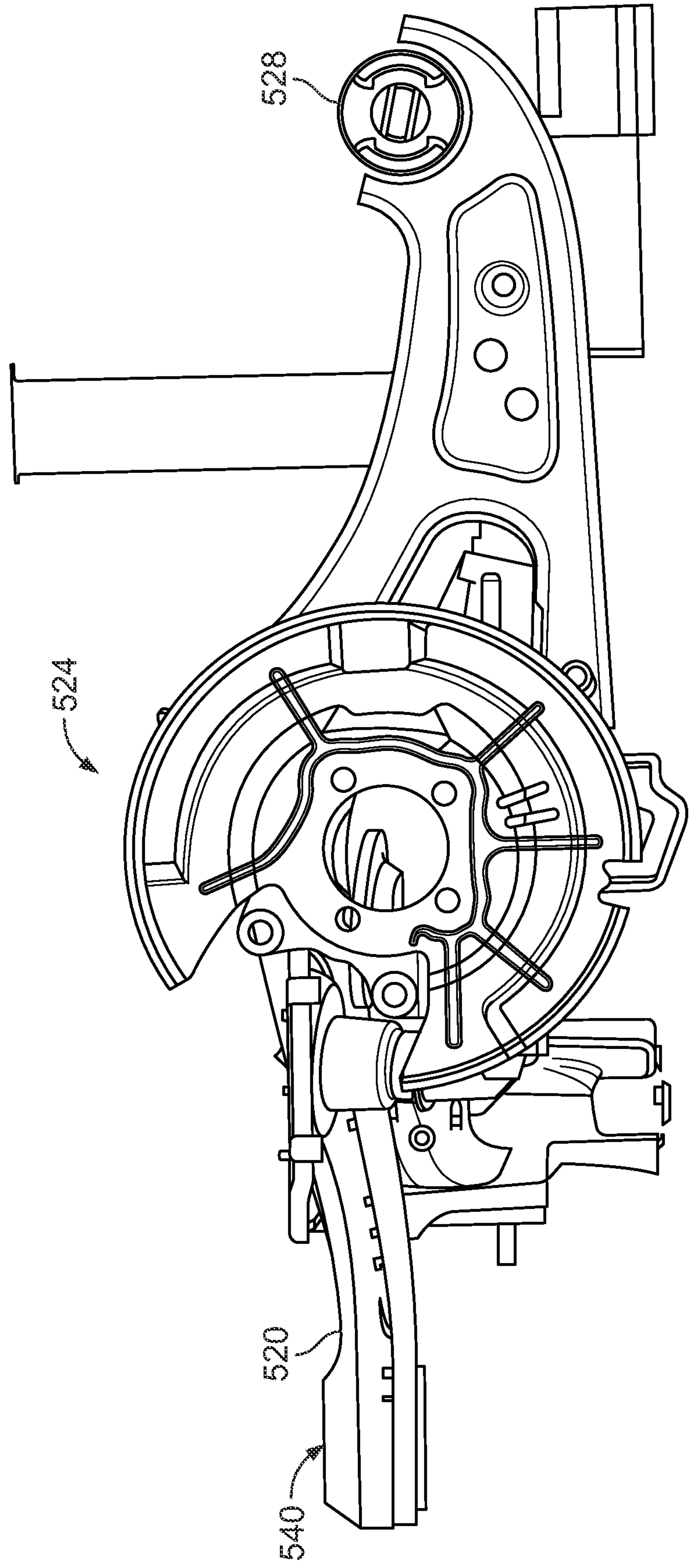
FIG. 10 is a side view of the modified rear suspension assembly.

In FIG. 10, the first trailing arm 524 is shown from a side view. The trailing arm 524 may be the same as the second trailing arm 526. The trailing arms 524, 526 may be modified in such a manner that they pass below or underneath the vehicle floor 506. Conventionally, the trailing arms 324, 326 of FIG. 3 may pass through the floor 306, but modifications to the trailing arms 524, 526 may redirect or reorient the trailing arms in the embodiment of FIGS. 5-7 and 9-10.

In the modification of the rear suspension assembly 514, the front cross-member 516 may be welded or otherwise assembled to the mounting arms before the conventional front cross-member 316 is removed. Thus, the order in which the rear suspension assembly 514 is reconfigured or assembled may differ for various embodiments. By welding the front cross-member 516 first, this may keep the rear cradle aligned without changing the form, fit, or function thereof.

Another feature of the present disclosure is the motorized vehicle 200, 500 being a hybrid-type vehicle. In a hybrid vehicle, a high-voltage battery may be used in conjunction with an engine or other power-generating device, as is known in the industry. When modifying the vehicle 200, 500, and in particular lowering the floor for wheelchair access, the battery (not shown) may be displaced. In FIG. 6, for example, a high voltage tub 602 is shown for accommodating the battery. Here, the battery is located towards the front of the vehicle and below the driver's seat and front passenger seat. In other embodiments, however, the battery can be relocated towards the rear of the vehicle.

Figure 11:
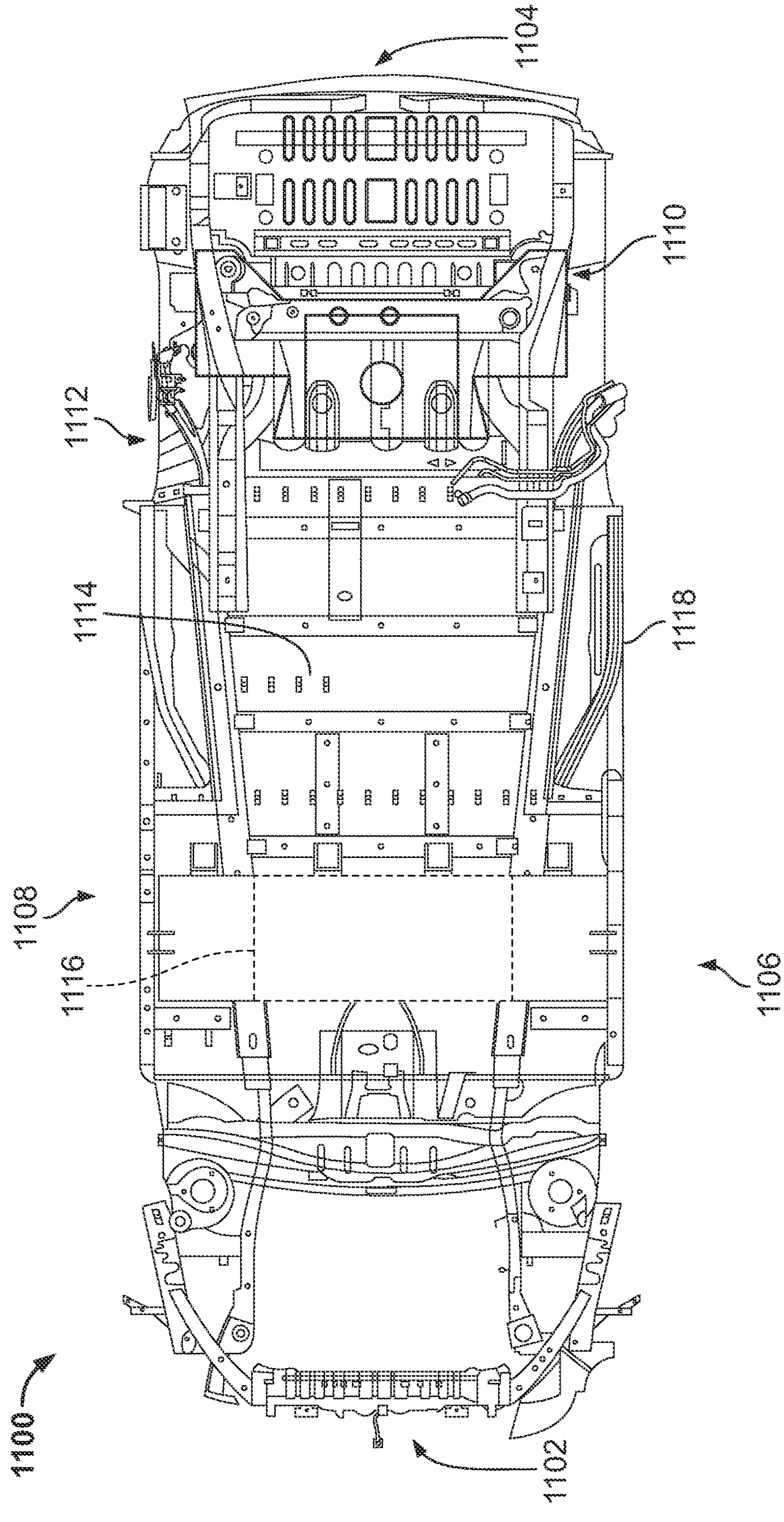
FIG. 11 is a top view of the vehicle with the modified fuel tank body.

Turning to FIG. 11, a top overview of a hybrid vehicle 1100 is shown. The vehicle 1100 may include a front end 1102, a rear end 1104, a driver's side 1106 and a passenger side 1108. The vehicle 1100 may include a body or chassis 1118 supported by front and rear wheels. A high voltage battery (not shown) may be located in a forward location 1116 as indicated in FIG. 11.

The vehicle 1100 may include a rear suspension assembly 1112 similar to the one described above and shown in FIGS. 5-7 and 9-10. The rear suspension assembly 1112 may be mounted between a rear axle (not shown) of the vehicle and the chassis 1118.

The vehicle 1100 may include a lowered vehicle floor 1114 designed to accommodate a lift, ramp, or other structure to support wheelchair accessibility. One of the issues when lowering the vehicle floor 1114 to provide wheelchair accessibility is providing sufficient clearance between the bottom of the vehicle and the underlying ground. In order to provide adequate ground clearance, it is often desired or necessary to lift the rear portion of the vehicle body or chassis 1118. In FIGS. 11-14, a redesigned fuel tank assembly 1110 may be provided to assist with body lift while also storing/supplying fuel to the engine or other power-generating device.

Figure 12:
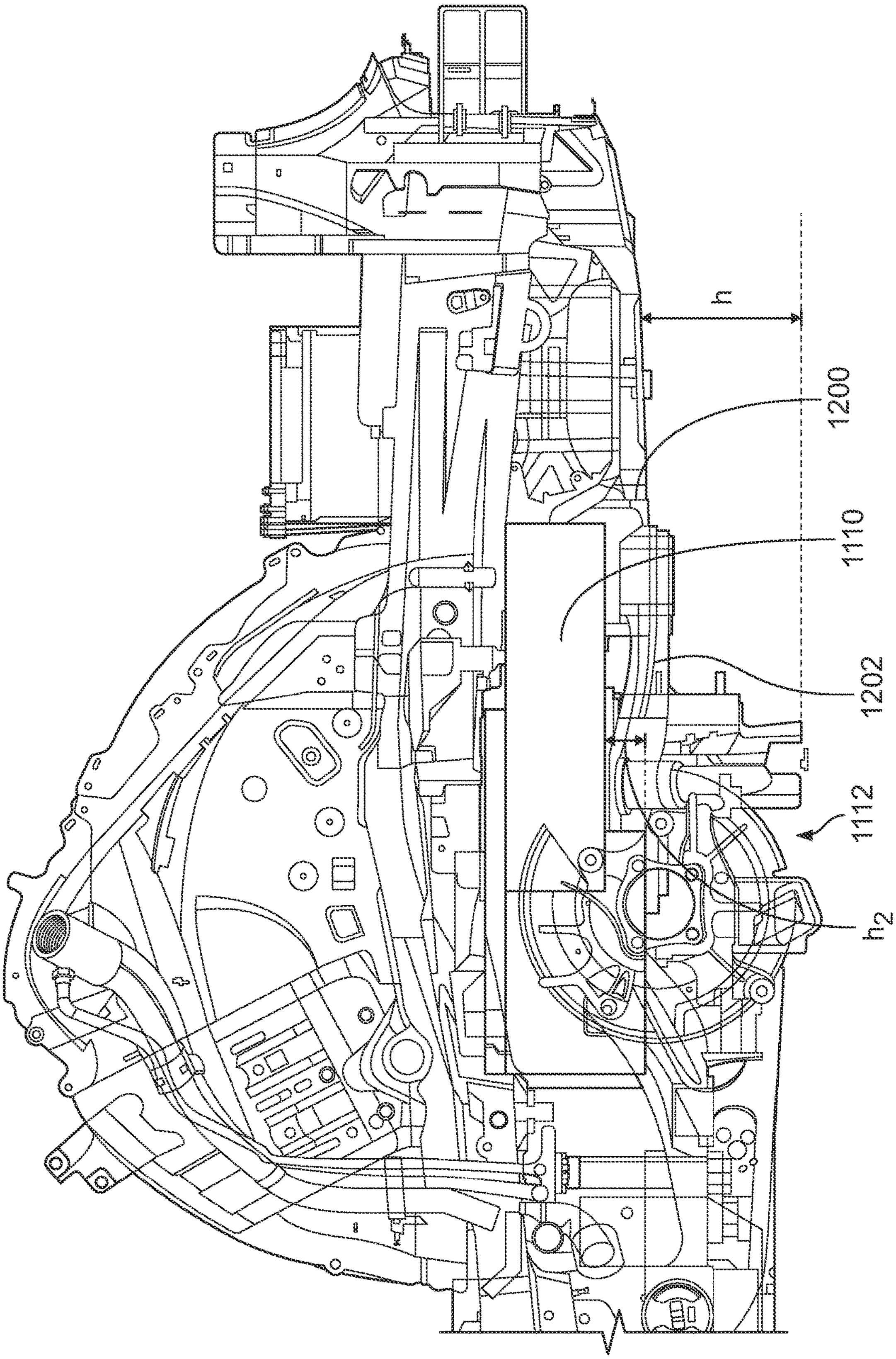
FIG. 12 is a side view of the modified fuel tank body.
Figure 13:
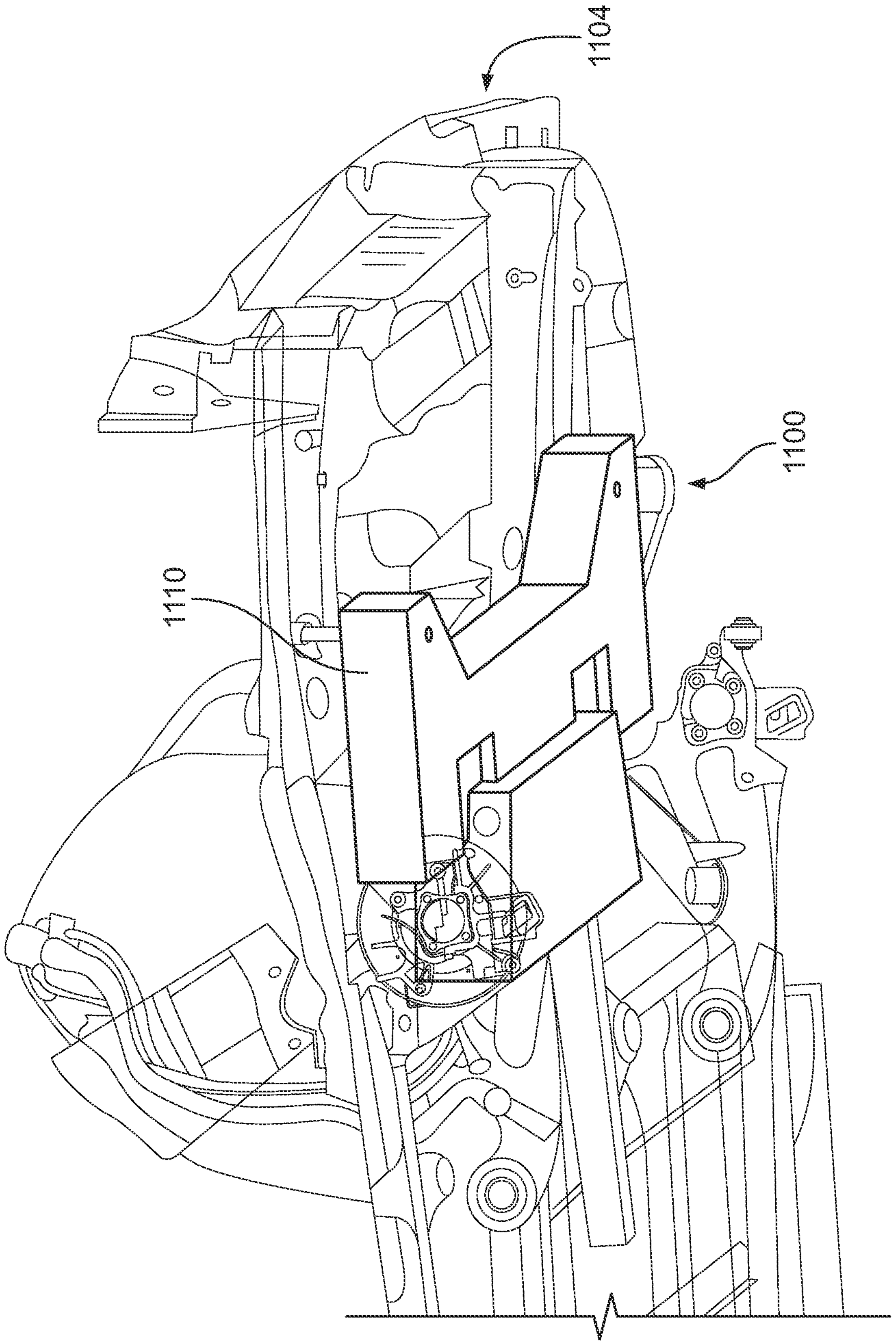
FIG. 13 is a bottom perspective view of a modified fuel tank body.

In FIG. 12, for example, a rear portion 1200 of the vehicle chassis 1118 is essentially raised by an amount, h, from the rear suspension assembly 1112. The fuel tank assembly 1110 comprises a low-profile design that facilitates the body lift of the rear portion 1200. In FIG. 12, it is also shown a mounting arm 1202 of the rear suspension assembly 1112 being mounted to the rear portion 1200 of the chassis 1118. Moreover, the fuel tank assembly 1110 may be positioned between the rear suspension assembly 1112 and the rear portion 1202 of the chassis 1118. In one example, the rear portion 1200 of the chassis 1118 may be raised by 1-12 inches. In another example, the rear portion 1200 may be raised by 2-10 inches. In a further example, the rear portion 1200 may be raised between 4-8 inches. In yet another example, the rear portion 1200 may be raised by approximately 6-7 inches. In one non-limiting example, the rear portion 1200 may be raised approximately 6.5 inches.

Figure 14:
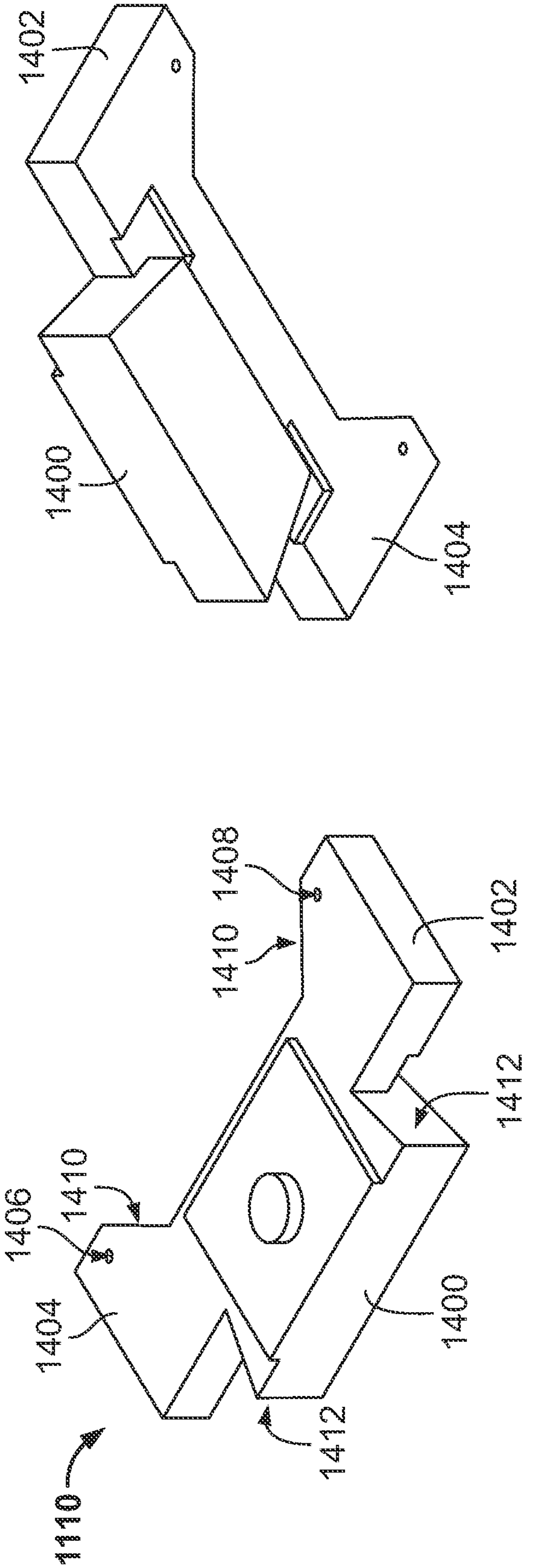
FIG. 14 is front and rear perspective views of the modified fuel tank body.

In FIG. 14, the fuel tank assembly 1110 is shown at different angles. As shown, the fuel tank assembly 1110 comprises a low-profile body 1400 forming a first wing portion 1402 and a second wing portion 1404 on opposite sides of a main portion of the body 1400. The main portion and each wing portion define an overall interior cavity for storing fuel for the vehicle. An opening or hole in the main portion or either wing portion may be coupled to a fuel line (not shown) for fluidly coupling the fuel tank 1110 to an engine of the vehicle, for example. Each wing portion may include one or more mounting holes 1406, 1408 for mounting the fuel tank assembly 1110 to the vehicle chassis 1118. Further, the wing portions each include a first angled portion 1410 and the main body 1400 comprises a pair of second angled portions 1412, as shown in FIG. 14. In one example, the first angled portion 1410 has a greater angle than the second angled portion 1412. In another example, the first angled portion 1410 may be approximately the same as the second angled portion 1412.

As shown in FIG. 12, the main body portion 1400 of the fuel tank assembly 1110 is located at least partially forward of the first and second wing portions. Further, there may be a height difference, h2, between the main body portion 1400 and each wing portion. In this manner, the first and second wing portions having a shorter height than the main body portion 1400, and with each wing portion being further rearward of the main body portion 1400, the wing portions enable the desired raise of the rear portion 1200 of the chassis (see FIG. 12).

As described herein, the present disclosure provides a fuel tank assembly 1110 capable of being designed as part of a body raise for a mobility transport vehicle. The fuel tank assembly 1110 may be relocated forward of a rearmost location of a conventional mobility vehicle.

In at least one example, the weight of the fuel tank assembly 1110 may be positioned over, or slightly in forward of, the rear axle of the vehicle. This may be advantageous when compared to another example where the fuel tank assembly is located rearward of the rear axle. In the latter example, a small moment arm may be created by the weight of the fuel which can cause the front end of the vehicle to lift or lose traction at the front wheels. It can also help with weight capacity issues if the fuel tank assembly 1110 is located forward of the rear axle. In the case it is not, however, additional steps can be taken to add weight to the front of the vehicle to enhance traction and weight capacity.

In a further example, the fuel tank assembly 1110 may be centrally located along a centerline V-V (FIG. 5) of the vehicle and protected when it is disposed more forward in the vehicle. This can help protect the vehicle in the event of rear impact to the vehicle.

In yet a further example, the fuel tank assembly 1110 may be disposed at a location closer to a fuel fill neck when it is positioned forward of the rear axle. In this example, the location closer to the fuel fill neck may be beneficial for emissions.

In another example of the present disclosure, the fuel tank assembly 1110 may be located forward of the rear axle such that the high voltage battery storage tub can still be retained and used with the modified vehicle. In a different example, the fuel tank assembly 1110 may be located rearward of the rear axle, in which case the conventional storage tub or a modified storage tub may be used. For instance, it may be possible to position the fuel tank assembly 1110 and storage tub vertically with respect to one another either forward, rearward or in proximate alignment with the rear axle. In one such example, the fuel tank assembly 1110 and storage tub (and thus high voltage battery) may be located below a rear passenger seat or bench seat of the vehicle.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of modifying a vehicle having a high voltage battery to be capable of transporting at least one wheelchaired passenger, the vehicle including a floor and a high voltage battery, the method comprising the steps of:
- removing the high voltage battery;
- removing at least a portion of the floor of the vehicle;
- mounting a replacement floor assembly to the vehicle, the replacement floor assembly comprising a high voltage tub configured to receive the high voltage battery, the replacement floor assembly being configured to receive an accessibility device rearward of the high voltage tub; and,
- mounting the high voltage battery within the high voltage tub of the replacement floor assembly.

2. The method of claim 1, further comprising the step of mounting the accessibility device to the replacement floor assembly, wherein the accessibility device comprises one of a ramp and a lift.

3. The method of claim 1, wherein the replacement floor assembly includes a lowered portion configured to receive an accessibility device rearward of the high voltage tub, the method further comprising the step of mounting the accessibility device in the lowered portion.

4. The method of claim 1, wherein the replacement floor assembly further comprises a rear floor and rear wall, wherein at least a portion of the rear floor and rear wall protrude rearward of a front end of a rear suspension assembly.

5. The method of claim 4, further comprising the steps of:
- disassembling the rear suspension assembly from the chassis;
- decoupling a front cross-member from a first mounting arm and a second mounting arm of the rear suspension assembly;
- coupling a second front cross-member to the first mounting arm and the second mounting arm; and
- assembling the rear suspension assembly with the second front cross-member to the chassis such that the second front cross-member is located rearward of the front cross-member.

6. The method of claim 5, further comprising disconnecting the first and second mounting arms from the chassis.

7. The method of claim 5, further comprising providing a rear cross-member coupled to the first and second mounting arms rearward of the front cross-member, the rear cross-member being located rearward of the second front cross-member.

8. The method of claim 5, wherein:
- the front cross-member coupled at a first location to the respective first and second mounting arms;
- the second front cross-member coupled to the first and second mounting arms at a second location along the respective mounting arm, where the second location is rearward of the first location along each mounting arm.

9. The method of claim 1, further comprising the step of mounting a fuel tank assembly between a rear suspension assembly and a chassis of the vehicle.

10. The method of claim 1, further comprising:
- removing an OEM fuel tank from the vehicle;
- providing a low-profile fuel tank;
- coupling the low-profile fuel tank to a chassis, the low-profile fuel tank being coupled to the chassis at a location proximate of a rear axle of the vehicle.

11. The method of claim 10, wherein the low-profile fuel tank is coupled to the chassis rearward of a rear suspension assembly.

12. The method of claim 1, further comprising installing a substantially flat floor surface disposed above the high voltage tub of the replacement floor assembly, the floor surface having at least one or more anchors for seat mounting.

13. The method of claim 12, wherein the seat anchors support a first row of occupant seating.

14. A wheelchair accessible vehicle, comprising:
- a chassis supported by at least one front wheel and at least one rear wheel;

a body coupled to the chassis including at least one door, the body defining an interior space configured to be occupied by at least one passenger;

a vehicle floor assembly coupled to the chassis, the vehicle floor assembly comprising a high voltage tub located below a floor surface of the interior space;

a high voltage battery disposed in the high voltage tub; and an accessibility device mounted to the vehicle floor assembly rearward of the high voltage tub;

wherein the accessibility device is disposed within a lowered portion of the vehicle floor assembly.

15. The wheelchair accessible vehicle of claim 14, wherein the vehicle floor assembly comprises a rear wall coupled to a rear end of the floor surface, wherein the rear wall defining the rearmost boundary of the floor surface, and wherein the rear wall protrudes rearward of a front end of a rear suspension assembly.

* * * * *